United States Patent
Sawada et al.

(10) Patent No.: US 6,780,963 B2
(45) Date of Patent: Aug. 24, 2004

(54) MOLDING MATERIAL FOR ELECTRICAL AND ELECTRONIC PARTS

(75) Inventors: Masahiro Sawada, Yamaguchi (JP); Kunihiro Ohuchi, Yamaguchi (JP)

(73) Assignee: Mitsui Chemicals, Inc., Tokyo (JP)

( * ) Notice: Subject to any disclaimer, the term of this patent is extended or adjusted under 35 U.S.C. 154(b) by 7 days.

(21) Appl. No.: 10/204,319

(22) PCT Filed: Feb. 20, 2001

(86) PCT No.: PCT/JP01/01203

§ 371 (c)(1), (2), (4) Date: Aug. 21, 2002

(87) PCT Pub. No.: WO01/60919

PCT Pub. Date: Aug. 23, 2001

(65) Prior Publication Data

US 2003/0055210 A1 Mar. 20, 2003

(30) Foreign Application Priority Data

Feb. 21, 2000 (JP) ........................................ 2000-048948

(51) Int. Cl.⁷ ...................... C08G 69/48; C08G 69/24; C08L 77/06; C08K 3/00; C08K 5/02

(52) U.S. Cl. ...................... 528/310; 528/322; 528/323; 528/332; 528/335; 528/336; 528/339; 524/409; 524/411; 524/412; 524/414; 524/430; 524/445; 524/449; 524/451; 524/464; 525/285; 525/420; 525/422; 525/432

(58) Field of Search ................................ 528/310, 322, 528/332, 335, 336; 524/409, 411, 412, 414, 430, 445, 449, 451, 464; 525/420, 422, 432

(56) References Cited

U.S. PATENT DOCUMENTS 4,673,728 A 6/1987 Nielinger et al. ........... 528/339
5,256,718 A * 10/1993 Yamamoto et al. ......... 524/411
RE34,447 E 11/1993 Poppe et al. ................ 528/328
5,852,165 A 12/1998 Tsumiyama et al. ........ 528/332
6,140,459 A * 10/2000 Leboeuf et al. ............. 528/310
2002/0019497 A1 * 2/2002 Mawatari et al. ........... 525/418
2002/0040089 A1 * 4/2002 Ouchi ......................... 524/464
2002/0086928 A1 * 7/2002 Ouchi ......................... 524/409
2002/0115818 A1 * 8/2002 Ogo et al. ................... 528/310
2003/0023008 A1 * 1/2003 Uchida et al. ............... 525/432

FOREIGN PATENT DOCUMENTS

| EP | 0 449 466 A1 | 10/1991 |
|---|---|---|
| JP | 3-043417 A | 2/1991 |
| JP | 3-56576 B2 | 8/1991 |
| JP | 3-201375 A | 9/1991 |
| JP | 3-281532 A | 12/1991 |
| JP | 4-004257 A | 1/1992 |
| JP | 6-239990 A | 8/1994 |
| JP | 7-228773 A | 8/1995 |
| JP | 8-1826 A | 1/1996 |
| JP | 2641788 B2 | 5/1997 |
| JP | 9-279023 A | 10/1997 |
| JP | 10-212407 A | 8/1998 |

* cited by examiner

Primary Examiner—P. Hampton Hightower
(74) Attorney, Agent, or Firm—Birch, Stewart, Kolasch & Birch, LLP

(57) ABSTRACT

The polyamide resin composition of the invention is characterized by having a solder reflow heat-resistant temperature of not lower than 250° C. Since the polyamdie resin composition has low water absorption and is excellent in moldability, heat resistance, shape stability and mechanical strength, it can be suitably used for, for example, automobile parts and electric or electronic parts.

20 Claims, 1 Drawing Sheet

MOLDING MATERIAL FOR ELECTRICAL AND ELECTRONIC PARTS

This application is the national phase under 35 U.S.C. §371 of PCT International Application No. PCT/JP01/01203 which has an International filing date of Feb. 20, 2001, which designated the United States of America.

TECHNICAL FIELD

The present invention relates to a polyamide resin. More particularly, the invention relates to a polyamide resin which has low water absorption, is excellent in moldability, mechanical strength and heat resistance and is favorably used for electric or electronic parts, a polyamide resin composition using the polyamide resin, and an electric or electronic part comprising the polyamide resin composition.

BACKGROUND ART

Resins used as materials of automobile parts and electric or electronic parts need to be excellent in heat resistance, moldability and low water absorption. Therefore, various aromatic polyamides having relatively high heat resistance and low water absorption have been heretofore proposed.

For example, the present applicant has proposed, in Japanese Patent Laid-Open Publication No. 281532/1991, a polyamide resin composition comprising an aromatic polyamide and a fibrous filler, wherein the aromatic polyamide comprises (a) dicarboxylic acid component units consisting of 52 to 58% by mol of terepthalic acid component units and 48 to 42% by mol of aliphatic dicarboxylic acid component units and (b) diamine component units consisting of aliphatic alkylenediamine component units and/or alicyclic alkylenediamine component units and has an intrinsic viscosity [$\eta$], as measured in concentrated sulfuric acid at 30° C., of 0.5 to 3.0 dl/g. This polyamide resin composition is relatively excellent in heat resistance, low water absorption, mechanical strength and impact resistance.

In Japanese Patent No. 2641788, a crystalline copolyamide having hexamethylene terephthalamide units and having a relative viscosity ($\eta r$) of 1.5 to 5.0 is described. More specifically, a copolyamide having a molar ratio (6T/6) of hexamethylene terephthalamide units to caproamide units of 70/30 and a copolyamide having a molar ratio (6T/66) of hexamethylene terephthalamide units to hexamethylene adipamide units of 55/45 are described.

In Japanese Patent Laid-Open Publication No. 1826/1996, an automobile part comprising a material obtained by adding an inorganic filler and a flame retarder to a crystalline terpolymer comprising (A) an equimolar salt (66 salt) of hexamethylene diamine and adipic acid, (B) an equimolar salt (6T salt) of hexamethylene diamine and terephthalic acid and (C) nylon 11 or nylon 12 is described. More specifically, a molded product of a resin composition using a terpolymer having a 6T/66/12 molar ratio of 50/50/3 or 60/40/5 is described.

In Japanese Patent Publication No. 56576/1991, a polyamide having high heat resistance and low water absorption is disclosed. As a result of studies by the present inventor, however, this polyamide has low flowability in the molding process and does not have sufficient moldability when it is molded into a complicated shape.

In recent years, a "lead-free solder" which uses no lead has been used as a solder for electric products from the viewpoint of environmental protection. The reflow temperature of the lead-free solder tends to be higher than that of an eutectic crystal solder of lead and tin which has been heretofore widely used. Therefore, when the lead-free solder is used to connect a printed wiring board with an electric or electronic part, the resin for forming the electric or electronic part needs to have higher heat resistance, particularly that in the solder reflow process.

In case of reflow mounting, the electric or electronic part may suffer occurrence of blister on its surface if the water absorption of the part is high. Therefore, a resin having lower water absorption is desired.

In recent years, further, miniaturization and higher precision of electric or electronic parts tend to be desired. For the electric or electronic parts, therefore, a resin composition of better moldability, which is capable of being injection molded into precision parts and exhibits excellent flowability in the molding process, is desired.

Under such circumstances, particularly for electric or electronic parts, there has been intensely desired development of a polyamide resin and a polyamide resin composition each of which is superior to the above-mentioned conventional polyamide resins in the heat resistance, low water absorption, mechanical strength and moldability.

OBJECT OF THE INVENTION

The present invention is intended to solve such problems as described above, and it is an object of the invention to provide a polyamide resin and a polyamide resin composition each of which has low water absorption, is excellent in moldability, mechanical strength and heat resistance and is suitably used for electric or electronic parts.

SUMMARY OF THE INVENTION

The present invention is a polyamide resin composition having a solder reflow heat-resistant temperature of not lower than 250° C.

The present invention is also a flame-retardant polyamide resin composition comprising a polyamide resin, a flame retarder, a flame retarder assistant and a fibrous reinforcement and having a solder reflow heat-resistant temperature of not lower than 250° C.

The polyamide resin composition according to the invention is a composition comprising a polyamide resin and having a solder reflow heat-resistant temperature of not lower than 250° C., wherein the polyamide resin comprises:
 (A) dicarboxylic acid component units comprising:
  (A1) aromatic dicarboxylic acid component units in amounts of not less than 60% by mol and less than 70% by mol, and
  (A2) aliphatic dicarboxylic acid component units and/or alicyclic dicarboxylic acid component units in amounts of more than 30% by mol and not more than 40% by mol, and
 (B) diamine component units comprising aliphatic alkylenediamine component units and/or alicyclic alkylenediamine component units,
said polyamide resin having an intrinsic viscosity, as measured by the use of concentrated sulfuric acid at 25° C., of not less than 0.5 dl/g and not more than 3.0 dl/g.

The polyamide resin preferably comprises:
 (a) dicarboxylic acid component units comprising 61 to 64% by mol of aromatic dicarboxylic acid component units and 39 to 36% by mol of aliphatic dicarboxylic acid component units, and
 (b) diamine component units comprising aliphatic alkylenediamine component units and/or alicyclic alkylenediamine component units, and preferably has an intrinsic viscosity [η], as measured in concentrated sulfuric acid at 25° C., of not less than 0.7 dl/g and not more than 1.2 dl/g.

In the polyamide resin of the invention, the aromatic dicarboxylic acid component units are also preferably terephthalic acid component units and/or isophthalic acid component units.

The polyamide resin composition of the invention comprises:

the above-mentioned polyamide resin, and at least one substance selected from the group consisting of a fibrous reinforcement, a modified polymer, an ionomer resin, an aliphatic polyamide and a flame retarder.

The polyamide resin composition of the invention preferably is a polyamide resin composition containing the fibrous reinforcement in an amount of 5 to 250 parts by weight based on 100 parts by weight of the polyamide resin, or a polyamide resin composition containing the modified polymer and/or the ionomer resin in an amount of 1 to 70 parts by weight based on 100 parts by weight of the polyamide resin, or a polyamide resin composition containing the aliphatic polyamide in an amount of 1 to 70 parts by weight based on 100 parts by weight of the polyamide resin. The polyamide resin composition of the invention also preferably comprises the polyamide resin and two or more substances selected from the group consisting of a fibrous reinforcement, a modified polymer, an ionomer resin, an aliphatic polyamide, 2 to 100 parts by weight of a flame retarder based on 100 parts by weight of the polyamide resin, and 2 to 20 parts by weight of a flame retarder assistant based on 100 parts by weight of the polyamide resin.

The electric or electronic part according to the present invention comprises the polyamide resin composition.

DETAILED DESCRIPTION OF THE INVENTION

Figure 1:
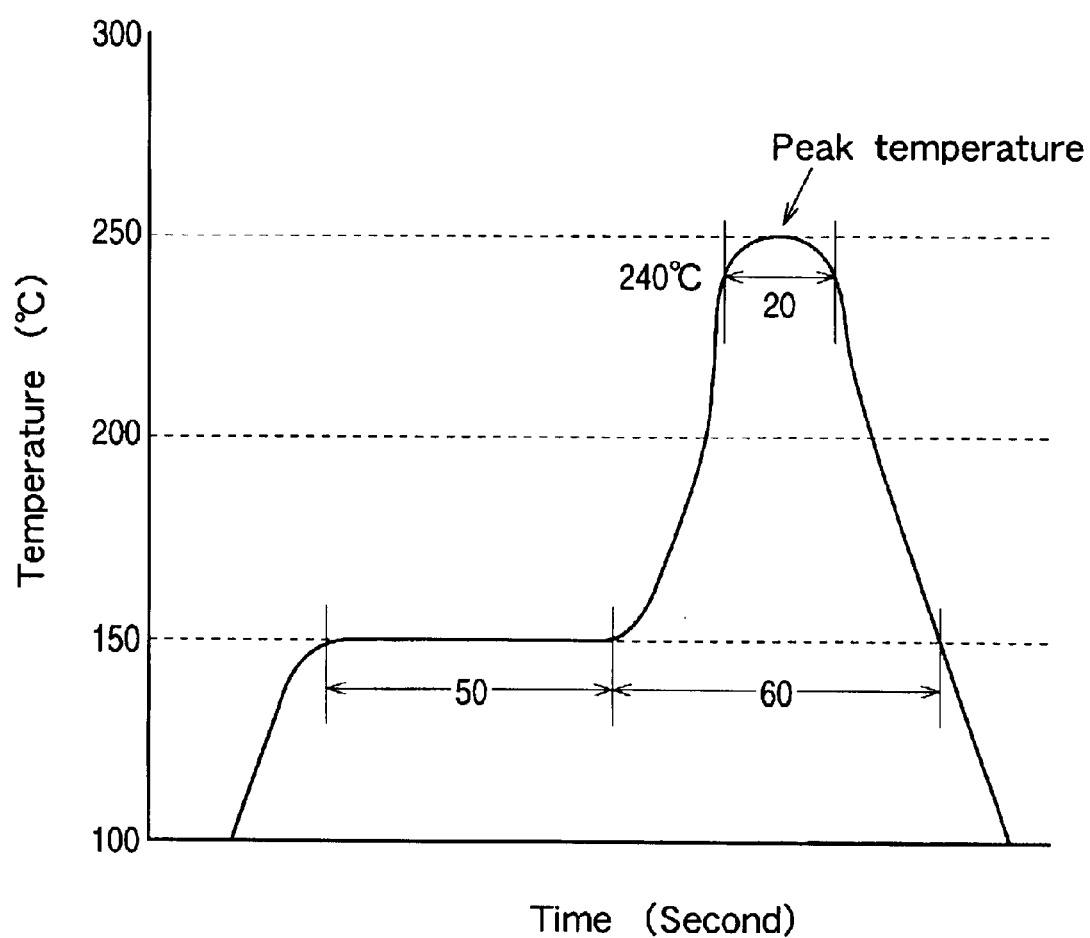
FIG. 1 is a view to explain a temperature profile of the reflow process for evaluating blister in the heating.

The present invention is described in detail hereinafter.

Polyamide resin composition

The polyamide resin composition of the invention has a solder reflow heat-resistant temperature of not lower than 250° C.

In the present invention, the "solder reflow heat-resistant temperature" means a maximum temperature (peak temperature) of the temperatures at which a specimen is not melted and has no blister on its surface after the reflow process. The solder reflow heat-resistant temperature is sometimes referred to as a "heat-resistant temperature" or "heat resistance" simply hereinafter.

The maximum temperature of the temperatures at which a specimen is not melted and has no blister on its surface after the reflow process is preferably not lower than 250° C. When this maximum temperature is in this range, the resulting electric or electronic part, particularly an electric or electronic part to be mounted on a printed wiring board using a lead-free solder, exhibits excellent reflow heat resistance. If the solder reflow heat-resistant temperature is lower than the above temperature, the resulting electric or electronic part occasionally has a defect of being melted or blistering in the reflow process.

Evaluation of the heat resistance in the reflow process is carried out by heating a specimen or an electric or electronic part obtained by injection molding by the use of a known reflow device such as an infrared heating device, a hot air heating device or a saturated vapor heating device. Particularly, a reflow soldering device of infrared and hot air combination type is preferably employed. Since the electric or electronic part may be produced in an environment of high temperature and high humidity, it is preferable to carry out the evaluation after moistening of the specimen or the electric or electronic part in order to more accurately evaluate the heat resistance of the reflow process.

In the present invention, a specimen obtained by injection molding was moistened at a temperature of 40° C. and a relative humidity of 95% for 96 hours, and then a reflow process of such a temperature profile that the specimen was heated up to the preset peak temperature (see FIG. 1) was carried out by the use of a reflow soldering device of infrared and hot air combination type. For measuring the temperature profile, the specimen was placed on a glass epoxy substrate having a thickness of 1 mm and a temperature sensor was set up on the substrate.

The polyamide resin composition of the invention has excellent moldability. As a measure of moldability, a length of a specimen obtained by the Barflow method is employable. Using IS-55EPN manufactured by Toshiba Machine Co., Ltd., a polyamide resin composition is injection molded under the conditions of a cylinder temperature higher than the melting point of the polyamide resin composition by 10° C., a mold temperature of 120° C. and an injection pressure of 100 MPa to prepare a specimen of 10 mm width and 0.5 mm thickness, and in this case, the length of the specimen is not less than 40 mm, preferably not less than 50 mm.

When the length of a specimen obtained by the Barflow method is in the above range, flowability required when the polyamide resin composition is molded into an electric or electronic part of complicated shape such as a connector is satisfied. Therefore, such a polyamide resin composition can be favorably used for forming an electric or electronic part.

The polyamide resin composition of the invention has excellent toughness. As a measure of toughness, fracture energy in bending is employable. The fracture energy in bending of a specimen having a length of 64 mm, a width of 6 mm and a thickness of 0.8 mm prepared from the composition of the invention is preferably not less than 40 mJ, more preferably not less than 45 mJ.

When the fracture energy in bending is in the above range, strength and toughness required for an electric or electronic part, particularly for a connector, are satisfied. Therefore, fracture of a connector does not occur when a pin is inserted into the connector.

The solder reflow heat-resistant temperature, the Barflow's length and the fracture energy in bending have close relations to the structure and the intrinsic viscosity of a polyamide resin used for the composition.

Polyamide resin

The polyamide resin of the invention comprises dicarboxylic acid component units (a) and diamine component units (b).

The dicarboxylic acid component units (a) to constitute the polyamide resin of the invention comprise aromatic dicarboxylic acid component units, and aliphatic dicarboxylic acid component units and/or alicyclic dicarboxylic acid component units (referred to as "aliphatic/alicyclic dicarboxylic acid component units" hereinafter).

The aromatic dicarboxylic acid component units are preferably terephthalic acid component units and/or isophthalic acid component units. In the present invention, the aromatic dicarboxlic acid component units are particularly preferably terephthalic acid component units.

The aliphatic dicarboxylic acid component units may be straight-chain or branched-chain, and the number of their carbon atoms is not specifically restricted. However, the aliphatic dicarboxylic acid component units are desirably those derived from an aliphatic dicarboxylic acid of preferably 4 to 25 carbon atoms, more preferably 4 to 12 carbon atoms. Examples of the aliphatic dicarboxylic acids used for deriving these aliphatic dicarboxylic acid component units include succinic acid, adipic acid (AA), azelaic acid, sebacic acid, decanedicarboxylic acid, undecanedicarboxylic acid and dodecanedicarboxylic acid. Of these, adipic acid (AA) is particularly preferable.

The alicyclic dicarboxylic acid component units are usually component units derived from a dicarboxylic acid having about 6 to 25 carbon atoms and at least one alicylic hydrocarbon ring.

Examples of such alicyclic dicarboxylic acid component units include those derived from alicyclic dicarboxylic acids, such as 1,3-cyclohexanedicarboxylic acid, 1,4-cyclohexanedicarboxylic acid, 1,3-bis(dicarboxymethyl)cyclohexane, 1,4-bis(carboxymethyl)cyclohexane, bis(4-carboxycyclohexyl)methane, bis(4-carboxycyclohexyl)propane, 4,4'-dicarboxy-3,3'-dimethyldicyclohexylpropane, 4,4'-dicarboxy-3,3'-dimethyldicyclohexylmethane, 4,4'-dicarboxy-3,3'-dimethyl-5,5'-dimethyldicyclohexylmethane, 4,4'-dicarboxy-3,3'-dimethyl-5,5'-dimethyldicyclohexylpropane, α,α'-bis(4-carboxylcyclohexyl)-p-diisopropylbenzene, α,α'-bis(4-carboxylcyclohexyl)-m-diisopropylbenzene, α,α'-bis(4-carboxylcyclohexyl)-1,4-cyclohexane and α,α'-bis(4-carboxylcyclohexyl)-1,3-cyclohexane.

In the polyamide resin of the invention, as the dicarboxylic acid component units (a), the aromatic dicarboxylic acid component units are contained in amounts of not less than 60% by mol and less than 70% by mol, preferably not less than 60% by mol and not more than 65% by mol, more preferably not less than 61% by mol and not more than 64% by mol, and the aliphatic/alicyclic dicarboxylic acid component units are contained in amounts of more than 30% by mol and not more than 40% by mol, preferably not less than 35% by mol and not more than 40% by mol, more preferably not less than 36% by mol and not more than 39% by mol. When the aromatic dicarboxylic acid component units and the aliphatic/alicyclic dicarboxylic acid component units as the dicarboxylic acid component units (a) are contained in the above amounts, a molded product obtained from the polyamide resin of the invention comprising the dicarboxylic acid component units (a) and the later-described diamine component units or obtained from a composition containing the polyamide resin has a high solder reflow heat-resistant temperature and is particularly excellent in moldability and toughness.

In addition to the aromatic dicarboxylic acid component units and the aliphatic/alicyclic dicarboxylic acid component units, polycarboxylic acid component units or aromatic dicarboxylic acid component units other than terephthalic acid component units may be further contained in small amounts, e.g., about not more than 10% by mol, as the dicarboxylic acid component units (a) in the present invention. Examples of such polycarboxylic acid component units include component units derived from tribasic acids and polybasic acids, such as trimellitic acid and pyromellitic acid.

The diamine component units (b) to constitute the polyamide resin of the invention may consist of only aliphatic diamine component units, may consist of aliphatic diamine component units and alicyclic diamine component units, or may consist of only alicyclic diamine component units.

The aliphatic diamine component units may be straight-chain alkylenediamine component units or may be branched-chain alkylenediamine component units. The aliphatic diamine component units are preferably straight-chain or branched-chain alkylenediamine component units having 4 to 25 carbon atoms, more preferably straight-chain or branched-chain alkylenediamine component units having 6 to 18 carbon atoms, particularly preferably straight-chain alkylenediamine component units having 6 to 18 carbon atoms.

Examples of the aliphatic diamine component units include component units derived from straight-chain alkylenediamines, such as 1,4-diaminobutane, 1,6-diaminohexane, 1,7-diaminoheptane, 1,8-diaminooctane, 1,9-diaminononane, 1,10-diaminodecane, 1,11-diaminoundecane and 1,12-diaminododecane; and component units derived from branched-chain alkylenediamines, such as 1,4-diamino-1,1-dimethylbutane, 1,4-diamino-1-ethylbutane, 1,4-diamino-1,2-dimethylbutane, 1,4-diamino-1,3-dimethylbutane, 1,4-diamino-1,4-dimethylbutane, 1,4-diamino-2,3-dimethylbutane, 1,2-diamino-1-butylethane, 1,6-diamino-2,5-dimethylhexane, 1,6-diamino-2,4-dimethylhexane, 1,6-diamino-3,3-dimethylhexane, 1,6-diamino-2,2-dimethylhexane, 1,6-diamino-2,2,4-trimethylhexane, 1,6-diamino-2,4,4-trimethylhexane, 1,7-diamino-2,3-dimethylheptane, 1,7-diamino-2,4-dimethylheptane, 1,7-diamino-2,5-dimethylheptane, 1,7-diamino-2,5-dimethylheptane, 1,8-diamino-2-methyloctane, 1,8-diamino-1,3-dimethyloctane, 1,8-diamino-1,4-dimethyloctane, 1,8-diamino-2,4-dimethyloctane, 1,8-diamino-3,4-dimethyloctane, 1,8-diamino-4,5-dimethyloctane, 1,8-diamino-2,2-dimethyloctane, 1,8-diamino-3,3-dimethyloctane, 1,8-diamino-4,4-dimethyloctane, 1,6-diamino-2,4-diethylhexane and 1,9-diamino-5-methylnonane.

Of the above straight-chain or branched-chain alkylenediamine component units, preferable are straight-chain alkylenediamine component units, and particularly preferable are component units derived from one or more compounds selected from straight-chain alkylenediamines such as 1,6-diaminohexane, 1,8-diaminooctane, 1,9-diaminononane, 1,10-diaminodecane and 1,12-diaminododecane.

The alicyclic diamine component units are usually component units derived from a diamine having about 6 to 25 carbon atoms and at least one alicyclic hydrocarbon ring.

Examples of such alicyclic diamine component units include component units derived from alicyclic diamines, such as 1,3-diaminocyclohexane, 1,4-diaminocyclohexane, 1,3-bis(aminomethyl)cyclohexane, 1,4-bis(aminomethyl)cyclohexane, isophoronediamine, piperazine, 2,5-dimethylpiperazine, bis(4-aminocyclohexyl)methane, bis(4-aminocyclohexyl)propane, 4,4'-diamino-3,3'-dimethyldicyclohexylpropane, 4,4'-diamino-3,3'-dimethyldicyclohexylmethane, 4,4'-diamino-3,3'-dimethyl-5,5'-dimethyldicyclohexylmethane, 4,4'-diamino-3,3'-dimethyl-5,5'-dimethyldicyclohexylpropane, α,α'-bis(4-aminocyclohexyl)-p-diisopropylbenzene, α,α'-bis(4-aminocyclohexyl)-m-diisopropylbenzene, α,α'-bis(4-aminocyclohexyl)-1,4-cyclohexane and α,α'-bis(4-aminolcyclohexyl)-1,3-cyclohexane.

Of the above alicyclic diamine component units, preferable are component units derived from alicyclic diamines such as bis(aminomethyl)cyclohexane, bis(4-aminocyclohexyl)methane and 4,4'-diamino-3,3'-dimethyldicyclohexylmethane, and particularly preferable are component units derived from alicyclic diamines such as bis(4-aminocyclohexyl)methane, 1,3-bis(aminocyclohexyl) methane and 1,3-bis(aminomethyl)cyclohexane.

The diamine component units to constitute the polyamide resin of the invention may further contain aromatic diamine component units in addition to the alkylenediamine component units. Examples of the aromatic diamine component units include component units derived from aromatic diamines such as m-xylylenediamine and p-xylylenediamine. These aromatic diamines may be used singly or in combination of two or more kinds.

The polyamide of the invention may further contain, in addition to the recurring unit consisting of the dicarboxylic acid component unit (a) and the diamine component unit (b), a recurring unit derived from a lactam or an aminocarboxylic acid of 6 to 20 carbon atoms, preferably 6 to 12 carbon atoms, within limits not prejudicial to the object of the present invention. Examples of the lactams and the aminocarboxylic acids include ε-caprolactam, 6-aminocaproic acid, ζ-enantholactam, η-capryllactam, ω-laurolactam, ω-undecalactam, 11-aminoundecanoic acid and 12-aminododecanoic acid. From the lactam or the aminocarboxylic acid, a recurring unit represented by the following formula is formed.

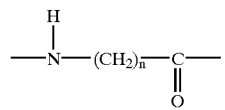

In the above formula, n is an integer of 5 to 20, preferably an integer of 5 to 19, particularly preferably an integer of 5 to 12.

The polyamide resin of the invention comprising the dicarboxylic acid component units (a) and the diamine component units (b) can be prepared by a hitherto known process.

More specifically, the polyamide resin can be prepared by polycondensing a dicarboxylic acid and a diamine capable of deriving the aforesaid component units of the polyamide resin.

The polyamide resin of the invention can also be obtained by polycondensing a salt of a dicarboxylic acid corresponding to the dicarboxylic acid component units (a) and a diamine corresponding to the diamine component units (b) through a solution process in the presence or absence of a solvent such as water.

The polyamide resin of the invention can also be obtained by producing an oligomer utilizing the above-mentioned solution process or the like and then polycondensing the oligomer utilizing solid phase polymerization.

The intrinsic viscosity [η] of the polyamide resin of the invention, as measured in concentrated sulfuric acid at 25° C., is not less than 0.5 dl/g, preferably not less than 0.6 dl/g, more preferably not less than 0.7 dl/g, particularly preferably not less than 0.9 dl/g, and is not more than 3.0 dl/g, preferably not more than 1.2 dl/g, more preferably not more than 1.0 dl/g. The intrinsic viscosity [η] is desired to be not less than 0.5 dl/g and not more than 3.0 dl/g, preferably not less than 0.6 dl/g and not more than 1.2 dl/g, more preferably not less than 0.7 dl/g and not more than 1.2 dl/g, particularly preferably not less than 0.9 dl/g and not more than 1.0 dl/g.

For measuring the intrinsic viscosity of the polyamide resin, a method of using phenol/tetrachloroethene (60/40 by weight) instead of the concentrated sulfuric acid is available. Also in the measurement of the intrinsic viscosity of the polyamide resin of the invention using this solution at 30° C., a value similar to that measured by the use of concentrated sulfuric acid is obtained, and the value obtained is usually not less than 0.6 dl/g and less than 1.2 dl/g.

The intrinsic viscosity [η] of the polyamide has a close relation to the solder reflow heat-resistant temperature, moldability and toughness of the polyamide composition.

Such a polyamide resin of the invention as described above has low water absorption and is excellent in moldability and heat resistance, so that it can be suitably used as a material of an electric or electronic part. The polyamide resin of the invention can also be suitably used as a polyamide resin composition that is a mixture of the polyamide and other components.

Flame-retardant polyamide resin composition

The flame-retardant polyamide resin composition according to the invention contains the above-described polyamide resin of the invention, a fibrous reinforcement, a flame retarder and a flame retarder assistant, and may contain a modified polymer, an ionomer resin and an aliphatic polyamide.

The polyamide resin composition of the invention may be a composition comprising the polyamide resin and 5 to 250 parts by weight of a fibrous reinforcement based on 100 parts by weight of the polyamide resin.

The polyamide resin composition of the invention may be a composition comprising the polyamide resin and 1 to 70 parts by weight of a modified polymer and/or an ionomer resin based on 100 parts by weight of the polyamide resin.

The polyamide resin composition of the invention may be a composition comprising the polyamide resin and 1 to 70 parts by weight of an aliphatic polyamide based on 100 parts by weight of the polyamide resin.

The polyamide resin composition of the invention may be a composition comprising the polyamide resin and two or more substances selected from the group consisting of a fibrous reinforcement, a modified polymer, an ionomer resin, an aliphatic polyamide and a flame retarder.

Fibrous reinforcement

In the polyamide resin composition of the invention, a fibrous reinforcement may be contained together with the polyamide resin.

The fibrous reinforcement preferably used is, for example, at least one inorganic and/or organic filler selected from the group consisting of aromatic polyamide fiber, glass fiber, carbon fiber, boron fiber, alumina fiber and metallic fiber.

Examples of the aromatic polyamide resins include Kevler (trade name, available from Dupont Co.), Twaron (trade name, available from Teijin Co.) and Technora (trade name: available from Teijin Ltd.)

Of the above fibrous reinforcements, the glass fiber and the carbon fiber is preferably used from the viewpoint of balance between cost and performance. When such a filler as mentioned above is added to the polyamide resin, the resulting composition is remarkably improved in the heat resistance such as a heat distortion temperature, and tends to be improved also in the high-temperature rigidity.

The fibrous reinforcement desirably has an average length of 0.1 to 20 mm, preferably 1 to 10 mm. When the average length of the fibrous reinforcement is in this range, the resulting polyamide resin composition is improved in the moldability, and a molded product obtained from the polyamide resin composition tends to be improved in the heat resistance properties such as a heat distortion temperature and in the mechanical properties such as tensile strength and flexural strength.

When the fibrous reinforcement is used, the amount of the fibrous reinforcement contained in the composition is desired to be in the range of usually 5 to 250 parts by weight, preferably 10 to 220 parts by weight, more preferably 15 to 150 parts by weight, based on 100 parts by weight of the polyamide resin of the invention. When the amount of the fibrous reinforcement is in this range, the polyamide resin composition is further enhanced in the heat distortion temperature and the high-temperature rigidity, so that such amount is preferable. If the amount of the fibrous reinforcement is less than 5 parts by weight based on 100 parts by weight of the polyamide resin, the effect of enhancement in the heat distortion temperature and the high-temperature rigidity of the polyamide resin composition is little, and in some cases sufficiently high heat distortion temperature and heat-resistant rigidity cannot be obtained. Further, even if the amount thereof is larger than 250 parts by weight, the heat distortion temperature is hardly improved.

Modified polymer

The modified polymer for use in the invention is, for example, a modified α-olefin polymer or a modified aromatic vinyl/conjugated diene block copolymer.

The modified α-olefin polymer is obtained by graft copolymerizing an a-olefin polymer mainly containing units derived from an α-olefin with an unsaturated carboxylic acid or its derivative.

The modified α-olefin polymer is desirably a polymer obtained by graft copolymerizing an α-olefin polymer mainly containing units derived from an α-olefin with an unsaturated carboxylic acid or its derivative in a graft quantity of usually 0.01 to 10 parts by weight, preferably 0.05 to 5 parts by weight, based on 100 parts by weight of the α-olefin polymer, and is desirably a polymer having a melt flow rate (MFR, 190° C.), as measured at 190° C., of 0.01 to 50 g/10 min, preferably 0.05 to 20 g/10 min.

The modified α-olefin polymer desirably has a molecular weight distribution (Mw/Mn) of usually 1.5 to 50, preferably 2 to 30.

If the graft quantity of the units derived from the unsaturated carboxylic acid or its derivative in the modified α-olefin polymer is smaller than 0.01 part by weight, the compatibility of this polymer with the polyamide resin becomes bad and the impact strength of the polyamide composition is lowered. If the graft quantity is larger than 10 parts by weight, the degree of crosslinking of the graft modification product is increased, and even if such quantity of the polymer is added to the polyamide, the effect of improvement in the impact resistance of the composition may be lowered.

The α-olefin polymer that is a base of the modified α-olefin polymer is a polymer mainly containing units derived from an α-olefin, and this polymer may be constituted of only units derived from two or more α-olefins or may contain small amounts of units derived from a diene in addition to the units derived from an α-olefin.

Examples of the α-olefins used for preparing the α-olefin polymer include ethylene, propylene, 1-butene, 1-pentene, 4-methyl-1-pentene, 1-hexene, 1-octene, 1-decene and 1-dodecene. Examples of the dienes include non-conjugated dienes, such as 1,4-hexadiene, dicyclopentadiene, 5-ethylidene-2-norbornene and 2,5-norbornadiene; and conjugated dienes, such as butadiene, isoprene and piperylene.

Examples of the α-olefin polymers include α-olefin copolymers, such as an ethylene/propylene copolymer, an ethylene/1-butene copolymer, an ethylene/4-methyl-1-pentene copolymer, an ethylene/1-hexene copolymer, an ethylene/1-octene copolymer, an ethylene/1-decene copolymer, a propylene/ethylene copolymer, a propylene/1-butene copolymer, a propylene/4-methyl-1-pentene copolymer, a propylene/1-octene copolymer, a propylene/1-decene copolymer and a propylene/1-dodecene copolymer; and α-olefin/non-conjugated diene copolymers, such as an ethylene/propylene/1,4-hexadiene copolymer, an ethylene/propylene/dicyclopentadiene copolymer, an ethylene/propylene/5-ethylidene-2-norbornene copolymer, an ethylene/propylene/2,5-norbornadiene copolymer, an ethylene/1-butene/dicyclopentadiene copolymer, an ethylene/1-butene/1,4-hexadiene copolymer and an ethylene/1-butene/5-ethylidene-2-norbornene copolymer.

By allowing the α-olefin polymer to react with the following unsaturated carboxylic acid or its derivative through the later-described process, the modified α-olefin polymer is obtained. Examples of the graft momoners used for graft modifying the α-olefin polymer include unsaturated dicarboxylic acids, such as acrylic acid, methacrylic acid, α-ethylacrylic acid, maleic acid, fumaric acid, itaconic acid, citraconic acid, tetrahydrophthalic acid, methyltetrahydrophthalic acid, endocis-bicyclo[2.2.1]hept-5-ene-2,3-dicarboxylic acid(nadic acid™) and methyl-endocis-bicyclo [2.2.1]hept-5-ene-2,3-dicarboxylic acid (methylnadic acid™); and derivatives of unsaturated dicarboxylic acids, e.g., acid halides, amides, imides, acid anhydrides and esters of the above unsaturated dicarboxylic acids, such as malenyl chloride, maleimide, maleic anhydride, citraconic anhydride, monomethyl maleate, dimethyl maleate and glycidyl maleate. Of these, preferable are unsaturated dicarboxylic acids and acid anhydrides thereof, and particularly preferable are maleic acid, nadic acid and anhydrides of these acids.

For preparing the modified α-olefin polymer by graft copolymerizing the α-olefin polymer with a graft monomer selected from the unsaturated carboxylic acids and their derivatives, various processes hitherto known are adoptable. For example, a process comprising melting the α-olefin polymer and adding the graft monomer to perform graft copolymerization or a process comprising dissolving the α-olefin polymer in a solvent and adding the graft monomer to perform graft copolymerization is available. In either case, the reaction is preferably carried out in the presence of a radical initiator in order to efficiently graft copolymerize the graft monomer. The graft reaction is carried out at a temperature of usually 60 to 350° C. The radical initiator is used in an amount of usually 0.01 to 20 parts by weight based on 100 parts by weight of the α-olefin polymer. As the radical initiator, an organic peroxide, an organic perester, an azo compound or the like is employable.

The modified aromatic vinyl/conjugated diene copolymer or its hydrogenation product for use in the invention is a graft modification product of a block copolymer of an aromatic vinyl hydrocarbon and a conjugated diene compound. In the present invention, a graft modification product of a hydrogenation product of the block copolymer is also employable.

Examples of the aromatic vinyl/conjugated diene copolymers and their hydrogenation products include a styrene/butadiene block copolymer rubber, a styrene/butadiene/styrene block copolymer rubber, a styrene/isoprene block copolymer rubber, a styrene/isoprene/styrene block copolymer rubber, a hydrogenated styrene/butadiene/styrene copolymer rubber and a hydrogenated styrene/isoprene/styrene block copolymer rubber.

In the copolymer, the molar ratio (aromatic vinyl hydrocarbon/conjugated diene) of recurring units derived from the aromatic vinyl to recurring units derived from the conjugated diene is in the range of usually 10/90 to 70/30. The hydrogenated copolymer rubber is a copolymer wherein a part of or all of double bonds remaining in the copolymer rubber are hydrogenated. The aromatic vinyl/conjugated diene copolymer or its hydrogenation product has an intrinsic viscosity [η], as measured in decalin at 135° C., of usually 0.01 to 10 dl/g, preferably 0.08 to 7 dl/g.

The modified aromatic vinyl/conjugated diene copolymer for use in the invention is prepared by graft modifying the unmodified aromatic vinyl/conjugated diene copolymer with an unsaturated carboxylic acid, an unsaturated carboxylic anhydride or an unsaturated carboxylic acid derivative, similarly to the process for preparing the modified α-olefin random copolymer.

Examples of the unsaturated carboxylic acids, the unsaturated carboxylic anhydrides and the unsaturated carboxylic acid derivatives used herein include the same compounds as used for preparing the graft modified α-olefin random copolymer. Such graft modifiers can be used singly or in combination of two or more kinds. Of such graft modifiers, an unsaturated carboxylic anhydride is preferably used, and maleic anhydride or nadic anhydride is particularly preferable.

For graft polymerizing the unmodified copolymer or its hydrogenation product with the graft modifier, such a solution process or a melting process as previously described for the modification of the α-olefin random copolymer is adoptable.

Although the amount of the graft modifier used in the graft reaction is determined in consideration of its reactivity, the graft modifier is generally used in an amount of 1 to 10 parts by weight based on 100 parts by weight of the unmodified aromatic vinyl/conjugated diene copolymer or its hydrogenation product. When the graft reaction is carried out, a radical initiator such as an organic peroxide, an organic perester or an azo compound can be used similarly to the aforesaid process. Through the graft reaction, there can be obtained a graft modified aromatic vinyl/conjugated diene copolymer or its hydrogenation product wherein the graft modifier has been graft polymerized in an amount of usually 0.01 to 10 parts by weight, preferably 0.05 to 5 parts by weight, based on 100 parts by weight of the unreacted aromatic vinyl/conjugated diene copolymer or its hydrogenation product. By the use of the graft modified aromatic vinyl/conjugated diene copolymer or its hydrogenation product, a molded product of excellent toughness can be obtained.

In the polyamide composition of the invention, the amount of the modified α-olefin polymer or the modified aromatic vinyl/conjugated diene block copolymer is in the range of preferably 1 to 70 parts by weight, more preferably 2 to 40 parts by weight, based on 100 parts by weight of the polyamide. When the amount of the modified α-olefin polymer is in the range of 1 to 70 parts by weight, the polyamide composition is enhanced in the tensile strength, flexural strength, elastic modulus and heat resistance, so that such amount is preferable.

Ionomer resin

The ionomer resin for use in the invention is, for example, a resin wherein an ethylene/unsaturated carboxylic acid copolymer is partially neutralized with a divalent metal ion or a monovalent metal ion. The ethylene/unsaturated carboxylic acid copolymer to constitute the ionomer resin is a copolymer of ethylene and an unsaturated carboxylic acid. Examples of the unsaturated carboxylic acids employable herein include unsaturated carboxylic acids of 3 to 8 carbon atoms, such as acrylic acid, methacrylic acid, itaconic acid, maleic anhydride, monomethyl maleate and monoethyl maleate. Of the unsaturated carboxylic acids, acrylic acid or methacrylic acid is particularly preferably employed.

The ethylene/unsaturated carboxylic acid copolymer for use in the invention may further contain a third component in addition to ethylene and the unsaturated carboxylic acid. Examples of the third components employable herein include polar vinyl compounds of about 3 to 12 carbon atoms, e.g., unsaturated carboxylic esters, such as ethyl acrylate, isobutyl acrylate, n-butyl acrylate and methyl acrylate, and vinyl esters, such as vinyl acetate. In the ethylene/unsaturated carboxylic acid copolymer for use in the invention, ethylene is present in an amount of usually 50 to 99% by weight, preferably 70 to 98% by weight, and the unsaturated carboxylic acid is present in an amount of usually 1 to 50% by weight, preferably 2 to 30% by weight. When the ethylene/unsaturated carboxylic acid copolymer contains the third component in addition to ethylene and the unsaturated carboxylic acid, the third component is present in an amount of usually not more than 40% by weight, preferably not more than 30% by weight.

In the ionomer resin for use in the invention, at least a part of the carboxyl groups of the ethylene/unsaturated carboxylic acid copolymer are neutralized with divalent metal ions or monovalent metal ions, preferably divalent transition metal ions. Examples of the metal ions preferably used for the ionomer resin include alkali metal ions, such as $Na^+$, $Li^+$ and $K^+$; divalent transition metal ions, such as $Zn^{++}$, $Co^{++}$, $Ni^{++}$, $Pb^{++}$ and $Cu^{++}$; and alkaline earth metal ions, such as $Ca^{++}$ and $Mg^{++}$. Of these, $Zn^{++}$ is particularly preferably employed.

The degree of neutralization of the carboxyl groups of the ethylene/unsaturated carboxylic acid copolymer with the divalent metal ions, preferably divalent transition metal ions, is preferably in the range of 3 to 95%. The metal to form the ionomer resin is not limited to one kind, and the ionomer resin for use in the invention may contain two or more kinds of metal ions. The ionomer resin is used in an amount equal to that of the modified copolymer. The ionomer resin can be used in combination with the modified polymer.

Aliphatic polyamide

Examples of the aliphatic polyamides for use in the invention include polyamides formed by polycondensation of aliphatic dicarboxylic acids and aliphatic diamines, polyamides formed by ring opening polymerization of lactams, and polyamides formed from aliphatic aminocarboxylic acids, aliphatic diamines and lactams.

Such aliphatic polyamides specifically includes polyamides formed from aliphatic diamines and aliphatic dicarboxylic acids, such as polytetramethylene adipamide, polyhexamethylene adipamide, polyhexamethylene suberamide, polyhexamethylene sebacamide, polyhexamethylene undecamide and polyhexamethylene dodecamide; and polyamides formed from lactams or aminocarboxylic acids, such as polycaprolactam, polyundecamide and polydodecamide.

Of the above aliphatic polyamides, any one of polycaprolactam, polyhexamethylene adipamide, polyhexamethylene suberamide, polyundecamide, polydodecamide, polyhexamethylene undecamide and polyhexamethylene dodecamide is preferably used in the invention because molding flowability of the resulting composition can be enhanced. Especially when polyundecamide, polydodecamide, polyhexamethylene undecamide or polyhexamethylene dodecamide is used, heat aging resistance of the composition can be improved. The intrinsic viscosity [η] (value measured in concentrated sulfuric acid at 30° C.) of the aliphatic polyamide is desired to be in the range of usually 0.5 to 3.0 dl/g, preferably 0.7 to 1.5 dl/g.

In the polyamide resin composition of the invention, the aliphatic polyamide is preferably contained in an amount of 1 to 70 parts by weight based on 100 parts by weight of the polyamide resin in the composition. The amount of the aliphatic polyamide contained in the polyamide resin composition of the invention is desired to be in the range of more preferably 1 to 30 parts by weight, still more preferably 3 to 20 parts by weight. By incorporating the above amount of the aliphatic polyamide into the polyamide resin composition of the invention, the resulting composition is capable of producing a molded product having improved toughness and good balance of properties such as heat resistance and low water absorption. In addition, the moldability of the composition can also be improved.

Flame retarder

Examples of the flame retarders for use in the invention include an organic flame retarder and an inorganic flame retarder assistant.

As the organic flame retarder, halognenated polystyrene and/or a condensate of halogenated phenol is particularly preferable. The halognenated polystyrene and the condensate of halogenated phenol are described below.

The halogenated polystyrene used as the organic flame retarder in the present invention is a polymer represented by the following formula.

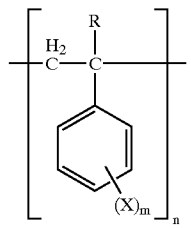

(1)

In the formula (1), R is hydrogen or methyl, X is Br or Cl, m is an integer of 1 to 5, and n is an integer of 2 or more. Examples of the halogenated polystyrenes represented by the formula (1) include polydibromostyrene, polytribromostyrene, polypentabromostyrene, polydichlorostyrene, polytrichlorostyrene, polypentachlorostyrene and polytribromo-α-methylstyrene. Of the halogenated polystyrenes, polytribromostyrene is preferable because it exhibits excellent effect of improvement in flame retardance, heat resistance and heat aging resistance. From the viewpoint of excellent moldability, polydibromostyrene is preferable.

The halogenated polystyrene is prepared by polymerizing halogenated styrene or halogenated α-methylstyrene, or halogenating polystyrene or poly-α-methylstyrene.

The condensate of halogenated phenol for use in the invention is represented by the following formula (2).

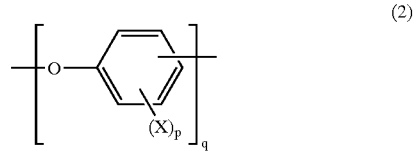

(2)

In the formula (2), X is Br or Cl, p is an integer of 1 to 4, and q is an integer of 5 or more. Examples of the condensates of halogenated phenol include polydibromo-p-phenylene oxide, polytribromo-p-phenylene oxide, polydichloro-p-phenylene oxide, polybromo-p-phenylene oxide and polydibromo-o-phenylene oxide. Of the condensates of halogenated phenol, polydibromo-p-phenylene oxide is preferable because it exhibits excellent effect of improvement in heat resistance and flame retardance.

Of the above halogenated polystyrenes and condensates of halogenated phenol as the flame retarders, polytribromostyrene and polydibromostyrene are most preferable because they show excellent heat stability in the molding of the composition and have excellent flame retardance effect.

As the inorganic flame retarder assistant, a metallic compound is preferably employed. Examples of the metallic compounds include metallic oxides, such as antimony oxide, zinc oxide, iron oxide and magnesium oxide, and metallic borates, such as zinc borate. Particularly, sodium antimonate is preferably contained. The sodium antimonate has chemical composition represented by the formula $NaSbO_3$ and is desirably used in the form of fine particles having a particle diameter of not more than 30 μm, particularly not more than 10 μm.

The polyamide composition of the invention preferably further contains magnesium oxide, zinc oxide, hydrotalcite or a phosphorus compound as a heat stabilizer. Such an oxide is desired to be as small as possible and preferably has a particle diameter of not more than 30 μm, particularly not more than 10 μm.

The organic flame retarder is desirably contained in an amount of 20 to 100 parts by weight, preferably 30 to 80 parts by weight, more preferably 40 to 65 parts by weight, based on 100 parts by weight of the polyamide. The inorganic flame retarder assistant is desirably contained in an amount of 2 to 20 parts by weight, preferably 4 to 16 parts by weight, more preferably 6 to 14 parts by weight, based on 100 parts by weight of the polyamide.

In the present invention, it is particularly preferable to use the organic flame retarder and the inorganic flame retarder assistant in combination. The composition comprising the polyamide of the invention and the flame retarder not only exhibits excellent flame retardance but also has little mold stain in the molding process, so that the composition is favorably used for parts which utilize reflow soldering.

Other components

The polyamide composition of the invention may further contain, in addition to the above components, various known additives, such as other heat stabilizers, weathering stabilizers, plasticizers, thickening agents, antistatic agents, release agents, pigments, dyes, inorganic or organic fillers, nucleating agents and inorganic compounds (e.g., carbon black, talc, clay, mica), within limits not prejudicial to the object of the present invention.

Moreover, other various polymers may be contained. For example, polyolefins, such as polyethylene, polypropylene and poly-4-methyl-1-pentene, olefin polymers, such as an ethylene/propylene copolymer, an ethylene/1-butene copolymer, a propylene/ethylene copolymer and a propylene/1-butene copolymer, polystyrene, polyamide, polycarbonate, polyacetal, polysulfone, polyphenylene oxide, fluororesin, silicone resin and aliphatic polyamide may be contained.

Preparation of polyamide resin composition

The polyamide composition of the invention can be obtained by mixing the components in a desired ratio by a hitherto known method. For example, the composition can be appropriately prepared by mixing the components using a Henschel mixer, a V-blender, a ribbon blender, a tumbling blender or the like, or by mixing the components, then melt kneading the mixture using a single-screw extruder, a multi-screw extruder, a kneader, a Banbury mixer or the like and then granulating or pulverizing the kneadate.

For example, with maintaining the polyamide resin of the invention in a molten state under heating at a temperature of, for example, 280 to 360° C., the aforesaid fibrous filler, modified polymer, ionomer resin, aliphatic polyamide, flame retarder and various additives are optionally added to the polyamide resin, and they are kneaded to prepare the polyamide resin composition of the invention. In this process, a usual kneading apparatus, such as an extruder or a kneader, is employable.

By processing the polyamide resin composition of the invention prepared, for example, into particles, pellets or other shapes and then subjecting them to compression molding, injection molding, extrusion molding or the like, various molded articles can be produced.

The polyamide resin composition of the invention has low water absorption and is excellent not only in moldability, mechanical strength properties and heat resistance but also in insulating properties. Therefore, the polyamide resin composition of the invention can be suitably used in a field where these properties are required or a field of precision molding. Specifically, the composition of the invention can be suitably used for various purposes as a molding material for automobile parts, electric or electronic parts such as connectors, and other various molded articles such as coil bobbins and housings. The polyamide resin composition of the invention can be particularly suitably used for the electric or electronic parts which need to have high heat resistance, insulating properties and shape stability, among the above purposes.

EFFECT OF THE INVENTION

The polyamide resin and the polyamide resin composition according to the invention have low water absorption and are excellent in moldability, heat resistance, shape stability and mechanical strength. Hence, they can be suitably used for, for example, automobile parts and electric or electronic parts.

The electric or electronic part according to the invention has low water absorption and is excellent in mechanical strength, insulating properties and heat resistance.

EXAMPLE

The present invention is further described with reference to the following examples, but it should be construed that the invention is in no way limited to those examples.

Measurement and Evaluation Method

In the following examples and comparative examples, intrinsic viscosities (a) $[\eta]_a$ and (b) $[\eta]_b$, moldability, flexural strength, water absorption and occurrence of blister in the heating process were measured and evaluated by the following methods.

Intrinsic Viscosity $[\eta]_a$

The intrinsic viscosity $[\eta]_a$ (dl/g) was measured in concentrated sulfuric acid at 25° C. in accordance with ISO 307-1984 (E).

Intrinsic Viscosity $[\eta]_b$

In the measurement of the intrinsic viscosity $[\eta]_a$, phenol/tetrachloroethane (60/40 by weight) was used instead of concentrated sulfuric acid and the temperature was changed to 30° C., to determine the intrinsic viscosity $[\eta]_b$ (dl/g).

Moldability-1

Using IS-55EPN manufactured by Toshiba Machine Co., Ltd., the polyamide resin composition was injection molded under the conditions of a cylinder temperature higher than the melting point of the polyamide resin composition by 10° C., a mold temperature of 120° C. and an injection pressure of 100 MPa to prepare a specimen of 10 mm width and 0.5 mm thickness. Then, the length of the specimen was measured.

Moldability-2

Using IS-55EPN manufactured by Toshiba Machine Co., Ltd., the polyamide resin composition was injection molded under the conditions of a cylinder temperature higher than the melting point of the polyamide resin composition by 10° C. and a mold temperature of 120° C. to prepare a 0.5 mm-pitch connector. Then, whether each part of the connector was filled with the resin or not was judged by visual observation. When each part was filled with the resin at an injection pressure of 80 MPa, the moldability was evaluated as AA; when each part was filled with the resin at an injection pressure of 100 MPa, the moldability was evaluated as BB; and when each part was not filled with the resin, the moldability was evaluated as CC.

Flexural Strength

A specimen of 64 mm×6.0 mm×0.8 mm was obtained by injection molding. After the specimen was absolutely dried, the strength of the specimen was measured under the conditions of a span of 26 mm and a bending rate of 5 mm/min.

Fracture Energy in Bending

The polyamide resin composition was injection molded under the conditions of an injection pressure of 100 MPa, a cylinder temperature higher than the melting point of the polyamide resin composition by 10° C. and a mold temperature of 120° C. to prepare a specimen of 64 mm length, 6 mm width and 0.8 mm thickness. The specimen was measured on the fracture energy in bending. The measurement was carried out using an Intesco automatic 5-hook bending test machine under the conditions of a span of 26 mm and a bending rate of 5 mm/min. The deflection was plotted as abscissa and the load was plotted as ordinate, and the area to the breaking point was taken as a fracture energy in bending (mJ).

Water Absorption

A specimen of 64 mm×6.0 mm×0.8 mm was prepared by injection molding. The specimen was stored in a constant-temperature constant-humidity room at 40° C. and a relative humidity of 95% to allow the specimen to absorb water. After the absorption of water for 96 hours, the weight of the specimen was measured by a precision balance. The water absorption (% by weight) was determined by the following formula.

$M=(M2-M1)/M1\times100$

M: water absorption (% by weight)

M1: absolute dry weight of specimen

M2: weight of specimen after absorption of water

Heat Resistance in Reflow Process

The polyamide resin composition was injection molded under the conditions of an injection pressure of 100 MPa, a cylinder temperature higher than the melting point of the polyamide resin composition by 10° C. and a mold temperature of 120° C. to prepare a specimen of 64 mm length, 6 mm width and 0.8 mm thickness. The specimen was moistened at a temperature of 40° C. and a relative humidity of 95% for 96 hours. Then, using a reflow soldering device of infrared and hot air combination type (SOLSYS-2001R, manufactured by Nippon Antom Kogyo K. K.), a reflow process of such a temperature profile that the specimen was heated up to the preset peak temperature (see FIG. 1) was carried out. For measuring the temperature profile, the specimen was placed on a glass epoxy substrate having a thickness of 1 mm and a temperature sensor was set up on the substrate.

Example 1

In a reaction vessel, 48.4 kg (292 mol) of terephthalic acid, 27.2 kg (186 mol) of adipic acid, 56.0 kg (482 mol) of 1,6-diaminohexane, 0.7 kg (6 mol) of benzoic acid, 0.1 kg (1 mol) of sodium biphosphite and 13.2 kg of distilled water were placed, and the inside of the vessel was thoroughly purged with nitrogen. With stirring, the internal temperature was raised to 250° C. over a period of 4 hours. After the reaction was continued for 1 hour, the reaction product in the reaction vessel was flashed into the atmosphere from a nozzle to perform solid-liquid separation and cooling at the same time, and then dried to obtain a polyamide low condensate having $[\eta]_a$ of 0.1 dl/g. The polyamide low condensate was subjected to solid phase polymerization at 240° C. for 2 hours and then melt polymerized by use of a twin-screw extruder to obtain a polyamide having $[\eta]_a$ of 0.9 dl/g and $[\eta]_b$ of 0.9 dl/g.

To 40 parts by weight of the polyamide, 30 parts by weight of a fibrous reinforcement (glass fiber, CS03JAFT2A available from Asahi Fiber Glass K. K., fiber diameter: 10 μm, average fiber length: 3 mm), 1.5 parts by weight of a modified polymer (maleic acid-modified SEBS (styrene/ethylene/butadiene/styrene block copolymer), Tuftec M1913 available from Asahi Chemical Industry Co., Ltd.), 25 parts by weight of a flame retarder (polydibromostyrene, PDBS-80 available from Great Lakes Chemical), 4.5 parts by weight of a flame retarder assistant (sodium antimonate, Sun Epoch NA-1070L available from Nissan Kagaku K. K.) and 0.3 part by weight of a halogen catcher (hydrotalcite, T-4C available from Kyowa Kagaku Kogyo K. K.) were added, and they were melt kneaded by a twin-screw extruder to obtain a composition.

The composition was evaluated on the moldability, flexural strength, water absorption and the heat resistance in the solder reflow process. The results are set forth in Table 1.

Example 2

A polyamide was prepared in the same manner as in Example 1, except that the amount of terephthalic acid was changed to 49.6 kg (299 mol) and the amount of adipic acid was changed to 26.2 kg (179 mol). The polyamide was measured on $[\eta]_a$ and $[\eta]_b$ in the same manner as in Example 1. The results are set forth in Table 1. Then, using the polyamide, a polyamide composition was prepared in the same manner as in Example 1. The composition was evaluated on the moldability, flexural strength, water absorption and the heat resistance in the solder reflow process. The results are set forth in Table 1.

Example 3

A polyamide was prepared in the same manner as in Example 1, except that the amount of terephthalic acid was changed to 49.6 kg (299 mol) and the amount of adipic acid was changed to 26.2 kg (179 mol). The polyamide was measured on $[\eta]_a$ and $[\eta]_b$ in the same manner as in Example 1. The results are set forth in Table 1. Then, using the polyamide, a polyamide composition was prepared in the same manner as in Example 1. The composition was evaluated on the moldability, flexural strength, water absorption and the heat resistance in the solder reflow process. The results are set forth in Table 1.

Example 4

A polyamide was prepared in the same manner as in Example 1, except that the amount of terephthalic acid was changed to 50.8 kg (306 mol) and the amount of adipic acid was changed to 25.1 kg (172 mol). The polyamide was measured on $[\eta]_a$ and $[\eta]_b$ in the same manner as in Example 1. The results are set forth in Table 1. Then, using the polyamide, a polyamide composition was prepared in the same manner as in Example 1. The composition was evaluated on the moldability, flexural strength, water absorption and the heat resistance in the solder reflow process. The results are set forth in Table 1.

Example 5

A polyamide was prepared in the same manner as in Example 1, except that the amount of terephthalic acid was changed to 47.6 kg (287 mol) and the amount of adipic acid was changed to 27.9 kg (191 mol). The polyamide was measured on $[\eta]_a$ and $[\eta]_b$ in the same manner as in Example 1. The results are set forth in Table 1. Then, using the polyamide, a polyamide composition was prepared in the same manner as in Example 1. The composition was evaluated on the moldability, flexural strength, water absorption and the heat resistance in the solder reflow process. The results are set forth in Table 1.

Example 6

A polyamide was prepared in the same manner as in Example 1, except that the amount of terephthalic acid was changed to 49.6 kg (299 mol) and the amount of adipic acid was changed to 26.2 kg (179 mol). The polyamide was measured on $[\eta]_a$ and $[\eta]_b$ in the same manner as in Example 1. The results are set forth in Table 1. Then, using the polyamide, a polyamide composition was prepared in the same manner as in Example 1. The composition was evaluated on the moldability, flexural strength, water absorption and the heat resistance in the solder reflow process. The results are set forth in Table 1.

Example 7

A polyamide was prepared in the same manner as in Example 1, except that the amount of terephthalic acid was changed to 51.6 kg (311 mol) and the amount of adipic acid was changed to 24.4 kg (167 mol). The polyamide was measured on $[\eta]_a$ and $[\eta]_b$ in the same manner as in Example 1. The results are set forth in Table 1. Then, using the polyamide, a polyamide composition was prepared in the same manner as in Example 1. The composition was evaluated on the moldability, flexural strength, water absorption and the heat resistance in the solder reflow process. The results are set forth in Table 1.

Comparative Example 1

A polyamide was prepared in the same manner as in Example 1, except that the amount of terephthalic acid was changed to 43.7 kg (263 mol) and the amount of adipic acid was changed to 31.4 kg (215 mol). The polyamide was measured on $[\eta]_a$ and $[\eta]_b$ in the same manner as in Example 1. The results are set forth in Table 1. Then, using the polyamide, a polyamide composition was prepared in the same manner as in Example 1. The composition was evaluated on the moldability, flexural strength, water absorption and the heat resistance in the solder reflow process. The results are set forth in Table 1.

Comparative Example 2

A polyamide was prepared in the same manner as in Example 1, except that the amount of terephthalic acid was changed to 59.6 kg (359 mol) and the amount of adipic acid was changed to 17.4 kg (119 mol). The polyamide was measured on $[\eta]_a$ and $[\eta]_b$ in the same manner as in Example 1. The results are set forth in Table 1. Then, using the polyamide, a polyamide composition was prepared in the same manner as in Example 1. The composition was evaluated on the moldability, flexural strength, water absorption and the heat resistance in the solder reflow process. The results are set forth in Table 1.

Because the polyamide resin had a high Tm of 345° C., the composition was foamed in the molding process to decompose the polyamide resin, so that the moldability and the heat resistance in the solder reflow process could not be evaluated.

Comparative Example 3

A polyamide was prepared in the same manner as in Example 1, except that the amount of terephthalic acid was changed to 55.7 kg (335 mol) and the amount of adipic acid was changed to 20.9 kg (143 mol). The polyamide was measured on $[\eta]_a$ and $[\eta]_b$ in the same manner as in Example 1. The results are set forth in Table 1. Then, using the polyamide, a polyamide composition was prepared in the same manner as in Example 1. The composition was evaluated on the moldability, flexural strength, water absorption and the heat resistance in the solder reflow process. The results are set forth in Table 1.

TABLE 1

|  | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 |
|---|---|---|---|---|---|---|---|---|---|---|
| Polyamide resin |  |  |  |  |  |  |  |  |  |  |
| 6T/66 (molar ratio) | 61/39 | 62.5/37.5 | 62.5/37.5 | 64/36 | 60/40 | 62.5/37.5 | 65/35 | 55/45 | 72/25 | 70/30 |
| $[\eta]_a$ (dl/g) | 0.9 | 0.9 | 1.1 | 0.9 | 0.9 | 1.4 | 0.9 | 0.9 | 1.0 | 1.0 |
| $[\eta]_b$ (dl/g) | 0.9 | 0.9 | 1.1 | 0.9 | 0.9 | 1.4 | 0.9 | 0.9 | 1.0 | 1.0 |
| Water absorption (%) | 4.5 | 4.3 | 4.3 | 4.0 | 4.8 | 4.1 | 3.9 | 5.4 | 2.7 | 3.0 |
| Polyamide resin composition Components (part(s) by weight) |  |  |  |  |  |  |  |  |  |  |
| Polyamide | 40 | 40 | 40 | 40 | 40 | 40 | 40 | 40 | 40 | 40 |
| Fibrous reinforcement | 30 | 30 | 30 | 30 | 30 | 30 | 30 | 30 | 30 | 30 |
| Modified polymer | 1.5 | 1.5 | 1.5 | 1.5 | 1.5 | 1.5 | 1.5 | 1.5 | 1.5 | 1.5 |
| Flame retarder | 25 | 25 | 25 | 25 | 25 | 25 | 25 | 25 | 25 | 25 |
| Halogen catcher | 0.3 | 0.3 | 0.3 | 0.3 | 0.3 | 0.3 | 0.3 | 0.3 | 0.3 | 0.3 |
| Moldability-1 | 63 | 62 | 60 | 57 | 65 | 55 | 53 | 70 | foamed in molding | 36 |
| Moldability-2 | AA | AA | AA | BB | AA | BB | BB | AA | foamed in molding | CC |
| Flexural strength (MPa) | 270 | 276 | 285 | 280 | 266 | 290 | 280 | 261 | 170 | 200 |
| Water absorption (% by weight) | 2.0 | 1.9 | 1.9 | 1.7 | 2.2 | 1.8 | 1.6 | 2.5 | 1.1 | 1.2 |
| Heat resistance in reflow process (° C.) | 252 | 255 | 255 | 258 | 250 | 257 | 260 | 240 | foamed in molding | 270 |
| Fracture energy in bending (mJ) | 44 | 43 | 44 | 41 | 45 | 45 | 40 | 46 | 28 | 33 |

What is claimed is:

1. A polyamide resin composition having a solder reflow heat-resistant temperature of not lower than 250° C., wherein the polyamide resin comprises:
   (A) a dicarboxylic acid component comprising:
      (A1) a terephthalic acid component present in an amount within the range of 60 mol % to less than 70 mol %, and
      (A2) an adipic acid component present in an amount within the range of more than 30 mol % to 40 mol %, and (B) at least one of a diamine component comprising an aliphatic alkylenediamine component and an alicyclic alkylenediamine component.

2. A flame-retardant polyamide resin composition comprising a polyamide resin, a flame retarder, a flame retarder assistant and a fibrous reinforcement and having a solder reflow heat-resistant temperature of not lower than 250° C., wherein the polyamide resin comprises:

(A) a dicarboxylic acid component comprising:
  (A1) a terephthalic acid component present in an amount within the range of 60 mol % to less than 70 mol %, and
  (A2) an adipic acid component present in an amount within the range of more than 30 mol % to 40 mol %, and
(B) at least one of a diamine component comprising an aliphatic alkylenediamine component and an alicyclic alkylenediamine component.

3. A polyamide resin composition comprising a polyamide resin and having a solder reflow heat-resistant temperature of not lower than 250° C., wherein the polyamide resin comprises:

(A) dicarboxylic acid component units comprising:
  (A1) a terephthalic acid component present in an amount within the range of 60 mol % to less than 70 mol %, and
  (A2) an adipic acid component present in an amount within the range of more than 30 mol % to 40 mol %, and
(B) at least one of a diamine component comprising an aliphatic alkylenediamine component and an alicyclic alkylenediamine component, said polyamide resin having an intrinsic viscosity, as measured by the use of concentrated sulfuric acid at 250° C., within the range of 0.5 dl/g to 3.0 dl/g.

4. The composition of claim 1, wherein said diamine component is derived from a straight-chain alkylenediamine selected from the group consisting of 1,4-diaminobutane, 1,6-diaminohexane, 1,7-diaminoheptane, 1,8-diaminooctane, 1,9-diaminononane, 1,10-diaminodecane, 1,11-diaminoundecane and 1,12-diaminododecane.

5. The composition of claim 1, wherein said diamine component is derived from a branched-chain alkylenediamine selected from the group consisting of 1,4-diamino-1,1-dimethylbutane, 1,4-diamino-1-ethylbutane, 1,4-diamino-1,2-dimethylbutane, 1,4-diamino-1,3-dimethylbutane, 1,4-diamino-1,4-dimethylbutane, 1,4-diamino-2,3-dimethylbutane, 1,2-diamino-1-butylethane, 1,6-diamino-2,5-dimethylhexane, 1,6-diamino-2,4-dimethylhexane, 1,6-diamino-3,3-dimethylhexane, 1,6-diamino-2,2-dimethylhexane, 1,6-diamino-2,2,4-trimethylhexane, 1,6-diamino-2,4,4-trimethylhexane, 1,7-diamino-2,3-dimethylheptane, 1,7-diamino-2,4-dimethylheptane, 1,7-diamino-2,5-dimethylheptane, 1,7-diamino-2,5-dimethylheptane, 1,8-diamino-2-methyloctane, 1,8-diamino-1,3-dimethyloctane, 1,8-diamino-1,4-dimethyloctane, 1,8-diamino-2,4-dimethyloctane, 1,8-diamino-3,4-dimethyloctane, 1,8-diamino-4,5-dimethyloctane, 1,8-diamino-2,2-dimethyloctane, 1,8-diamino-3,3-dimethyloctane, 1,8-diamino-4,4-dimethyloctane, 1,6-diamino-2,4-diethylhexane, and 1,9-diamino-5-methylnonane.

6. The composition of claim 1, wherein said alicyclic diamine component is derived from a alicyclic diamine selected from the group consisting of 1,3-diaminocyclohexane, 1,4-diaminocyclohexane, 1,3-bis (aminomethyl)cyclohexane, 1,4-bis (aminomethyl) cyclohexane, isophoronediamine, piperazine, 2,5-dimethylpiperazine, bis (4-aminocyclohexyl)methane, bis (4-aminocyclophexyl)propane, 4,4'-diamino-3,3'-dimethyldicyclohexylpropane, 4,4'-diamino-3,3'-dimethyldicyclohexylmethane, 4,4'-diamino-3,3'-dimethyl-5,5'-dimethyldicyclohexylmethane, 4,4'-diamino-3,3'-dimethyl-5,5'-dimethyldicyclohexylpropane, α,α'-bis (4-aminocyclohexyl)-p-diisopropylbenzene, α,α'-bis (4-aminocyclohexyl)-m-diisopropylbenzene, α,α'-bis (4-aminocyclohexyl)-1,4-cyclohexane and α,α'-bis (4-aminocyclohexyl)-1,3-cyclohexane.

7. The composition of claim 1, wherein said polyamide resin further includes a recurring component derived from a lactam or an aminocarboxylic acid having 6 to 20 carbon atoms.

8. The composition of claim 1, wherein said composition further includes at least one of a modified polymer, an ionomer resin, and an aliphatic polyamide.

9. The composition of claim 2, wherein said diamine component is derived from a straight-chain alkylenediamine selected from the group consisting of 1,4-diaminobutane, 1,6-diaminohexane, 1,7-diaminoheptane, 1,8-diaminooctane, 1,9-diaminononane, 1,10-diaminodecane, 1,11-diaminoundecane and 1,12-diaminododecane.

10. The composition of claim 2, wherein said diamine component is derived from a branched-chain alkylenediamine selected from the group consisting of 1,4-diamino-1,1-dimethylbutane, 1,4-diamino-1-ethylbutane, 1,4-diamino-1,2-dimethylbutane, 1,4-diamino-1,3-dimethylbutane, 1,4-diamino-1,4-dimethylbutane, 1,4-diamino-2,3-dimethylbutane, 1,2-diamino-1-butylethane, 1,6-diamino-2,5-dimethylhexane, 1,6-diamino-2,4-dimethylhexane, 1,6-diamino-3,3-dimethylhexane, 1,6-diamino-2,2-dimethylhexane, 1,6-diamino-2,2,4-trimethylhexane, 1,6-diamino-2,4,4-trimethylhexane, 1,7-diamino-2,3-dimethylheptane, 1,7-diamino-2,4-dimethylheptane, 1,7-diamino-2,5-dimethylheptane, 1,7-diamino-2,5-dimethylheptane, 1,8-diamino-2-methyloctane, 1,8-diamino-1,3-dimethyloctane, 1,8-diamino-1,4-dimethyloctane, 1,8-diamino-2,4-dimethyloctane, 1,8-diamino-3,4-dimethyloctane, 1,8-diamino-4,5-dimethyloctane, 1,8-diamino-2,2-dimethyloctane, 1,8-diamino-3,3-dimethyloctane, 1,8-diamino-4,4-dimethyloctane, 1,6-diamino-2,4-diethylhexane, and 1,9-diamino-5-methylnonane.

11. The composition of claim 2, wherein said alicyclic diamine component is derived from a alicyclic diamine selected from the group consisting of 1,3-diaminocyclohexane, 1,4-diaminocyclohexane, 1,3-bis (aminomethyl) cyclohexane, 1,4-bis (aminomethyl) cyclohexane, isophoronediamine, piperazine, 2,5-dimethylpiperazine, bis (4-aminocyclohexyl) methane, bis (4-aminocyclophexyl)propane, 4,4'-diamino-3,3'-dimethyldicyclohexylpropane, 4,4'-diamino-3,3'-dimethyldicyclohexylmethane, 4,4'-diamino-3,3'-dimethyl-5,5'-dimethyldicyclohexylmethane, 4,4'-diamino-3,3'-dimethyl-5,5'-dimethyldicyclohexylpropane, α,α'-bis (4-aminocyclohexyl)-p-diisopropylbenzene, α,α'-bis (4-aminocyclohexyl)-m-diisopropylbenzene, α,α'-bis (4-aminocyclohexyl)-1,4-cyclohexane and α,α'-bis(4-aminocyclohexyl)-1,3-cyclohexane.

12. The composition of claim 2, wherein said polyamide resin further includes a recurring component derived from a lactam or an aminocarboxylic acid having 6 to 20 carbon atoms.

13. The composition of claim 2, wherein said composition further includes at least one of a modified polymer, an ionomer resin, and an aliphatic polyamide.

14. The composition of claim 2, wherein fibrous reinforcement is selected from the group consisting of aromatic polyamide fiber, glass fiber, carbon fiber, boron fiber, alumina fiber, and metallic fiber.

15. The composition of claim 14, wherein said fibrous reinforcement is present in an amount within the range of 5 to 250 parts by weight based on the weight of the polyamide resin.

16. The composition of claim 3, wherein said diamine component is derived from a straight-chain alkylenediamine selected from the group consisting of 1,4-diaminobutane, 1,6-diaminohexane, 1,7-diaminoheptane, 1,8-diaminooctane, 1,9-diaminononane, 1,10-diaminodecane, 1,11-diaminoundecane and 1,12-diaminododecane.

17. The composition of claim 3, wherein said diamine component is derived from a branched-chain alkylenediamine selected from the group consisting of 1,4-diamino-1,1-dimethylbutane, 1,4-diamino-1-ethylbutane, 1,4-diamino-1,2-dimethylbutane, 1,4-diamino-1,3-dimethylbutane, 1,4-diamino-1,4-dimethylbutane, 1,4-diamino-2,3-dimethylbutane, 1,2-diamino-1-butylethane, 1,6-diamino-2,5-dimethylhexane, 1,6-diamino-2,4-dimethylhexane, 1,6-diamino-3,3-dimethylhexane, 1,6-diamino-2,2-dimethylhexane, 1,6-diamino-2,2,4-trimethylhexane, 1,6-diamino-2,4,4-trimethylhexane, 1,7-diamino-2,3-dimethylheptane, 1,7-diamino-2,4-dimethylheptane, 1,7-diamino-2,5-dimethylheptane, 1,7-diamino-2,5-dimethylheptane, 1,8-diamino-2-methyloctane, 1,8-diamino-1,3-dimethyloctane, 1,8-diamino-1,4-dimethyloctane, 1,8-diamino-2,4-dimethyloctane, 1,8-diamino-3,4-dimethyloctane, 1,8-diamino-4,5-dimethyloctane, 1,8-diamino-2,2-dimethyloctane, 1,8-diamino-3,3-dimethyloctane, 1,8-diamino-4,4-dimethyloctane, 1,6-diamino-2,4-diethylhexane, and 1,9-diamino-5-methylnonane.

18. The composition of claim 3, wherein said alicyclic diamine component is derived from a alicyclic diamine selected from the group consisting of 1,3-diaminocyclohexane, 1,4-diaminocyclohexane, 1,3-bis (aminomethyl) cyclohexane, 1,4-bis (aminomethyl) cyclohexane, isophoronediamine, piperazine, 2,5-dimethylpiperazine, bis (4-aminocyclohexyl) methane, bis (4-aminocyclohexyl)propane, 4,4'-diamino-3,3'-dimethyldicyclohexylpropane, 4,4'-diamino-3,3'-dimethyldicyclohexylmethane, 4,4'-diamino-3,3'-dimethyl-5,5'-dimethyldicyclohexylmethane, 4,4'-diamino-3,3'-dimethyl-5,5'-dimethyldicyclohexylpropane, α,α'-bis (4-aminocyclohexyl)-p-diisopropylbenzene, α,α'-bis (4-aminocyclohexyl)-m-diisopropylbenzene, α,α'-bis (4-aminocyclohexyl)-1,4-cyclohexane and α,α'-bis (4-aminocyclohexyl)-1,3-cyclohexane.

19. The composition of claim 3, wherein said polyamide resin further includes a recurring component derived from a lactam or an aminocarboxylic acid having 6 to 20 carbon atoms.

20. The composition of claim 3, wherein said composition further includes at least one of a modified polymer, an ionomer resin, and an aliphatic polyamide.

* * * * *